March 17, 1970  A. J. SCALZO ET AL  3,501,249
SIDE PLATES FOR TURBINE BLADES

Filed June 24, 1968  3 Sheets-Sheet 1

INVENTORS
Augustine J. Scalzo
and Andrew Zabrodsky
BY

United States Patent Office 3,501,249
Patented Mar. 17, 1970

3,501,249
SIDE PLATES FOR TURBINE BLADES
Augustine J. Scalzo, Philadelphia, and Andrew Zabrodsky, Boothwyn, Pa., assignors to Westinghouse Electric Corporation, Pittsburgh, Pa., a corporation of Pennsylvania
Filed June 24, 1968, Ser. No. 739,274
Int. Cl. F01d 5/08, 5/18, 7/00
U.S. Cl. 416—95
15 Claims

ABSTRACT OF THE DISCLOSURE

The invention comprises novel structure for retaining turbine blades in the periphery of a rotor disc and for controlling air or other cooling fluid past root portions of the blades secured within the periphery of the disc.

The periphery of the disc is provided with axially extending, side entry channels for receiving blade root portions. The channels and/or the root portions are formed to provide axially extending passageways which permit a cooling fluid to flow therethrough.

Plate structure is provided comprising two apertured plates for each turbine blade, one plate secured on the upstream side of the blade and one secured on the downstream side for controlling the flow of cooling fluid through the passageways. Each blade is provided with an indexing slot, and each plate is provided with a corresponding indexing tab for maintaining the plates in proper orientation with the blades. The plates are further provided with lip portions provided on opposed edges thereof for interlocking adjacently disposed plates together. The first and last plate on each side of one blade is provided with a bevelled edge and is locked in place by indexing lockscrews and suitable lockwashers.

BACKGROUND OF THE INVENTION

The invention relates generally to turbine rotors and particularly to a structure for locking turbine rotor blades in the periphery of a blade supporting disc and for cooling the root portions of the blades in a turbine.

It is known that higher initial operating temperatures in a turbine, for example an axial flow gas turbine, will provide high thermal efficiency and specific power output. It is also known that the allowable stress to which the blades can be subjected for a given blade life decreases with increasing temperatures. Thus, the main limiting factor in raising gas turbine operating temperatures, and thereby raising turbine efficiency and power output, is the physical capability of the rotating blades, the blades being highly stressed during turbine operation.

Rotating turbine blades are usually made individually and attached to the rim of a turbine wheel or disc so that they extend radially in an outward direction. When the disc is rotated, the blades are subjected to a tensile stress in the radial direction due to the centrifugal force (which is a function of the weight of the blade) attendant with rotation. The stress is greatest near the root or hub portion of the blade where it is attached to the turbine disc; the stress decreases toward the tip of the blade where it reaches a value of zero at the blade tip.

Presently, with most gas turbine designs, the temperature of the working gas flow is generally uniform along the radial height of the turbine blades. Since the root portion of the blade is stressed the greatest, and since an essentially uniform gas temperature flow sets the allowable stress for a particular blade and blade material, the root portion stress at a specified temperature is generally taken as the reference point in fixing the temperature at which the turbine blades are designed to operate in achieving a desired and efficient extraction of energy from the gas flow.

Thus, the roots of blades should be maintained as cool as possible in order to extract maximum energy from the gas flow through the turbine and to insure long life for the blades.

In the past, the cooling of the blade root portions has been attempted with a variety of means including a variety of blanking plate schemes in which plates are disposed on the upstream or downstream (or both) sides of the blades. The plates usually cooperate with lengthwise passages provided in the vane or airfoil portions of the blades to direct cooling air therethrough. The cooling effectiveness of these arrangements has been less than desirable, and the costs thereof have been more than desirable. Further, the securing and locking processes required to prevent the plates from coming loose with high speed rotation of the rotor have been cumbersome and not always effective.

BRIEF SUMMARY

The present invention provides a simple yet effective structure for independently controlling the flow of cooling fluid to and from the root of each rotor blade in a turbine while simultaneously providing an individual locking means for locking each blade in the periphery of a rotor disc. This is accomplished by simple apertured plates radially secured between grooves provided in the blades and disc on the upstream and downstream sides thereof, and root portions of the blades disposed in the periphery of the disc in a manner to provide axially extending clearances which function to conduct cooling fluid therethrough and through the apertures provided in said plates.

Each of the blades are further provided with an indexing slot, with each plate having an indexing tab receivable in said slot for properly locating and orienting the plates with their respective blades. The plates are further provided with oppositely facing lip or shoulder portions extending along two opposed edges thereof for interlocking adjacently disposed plates together.

The first and last plates on each side of two adjacent blades may be provided with an inwardly facing bevelled edge to permit said plates to be inserted between the blades and rotor disc; the first and last plates are then locked in place by indexing lockscrews and special lockwashers.

THE DRAWINGS

The invention, along with the objects and advantages thereof will be best understood from the following detailed description taken in connection with the accompanying drawings in which.

PREFERRED EMBODIMENT

Figure 1:
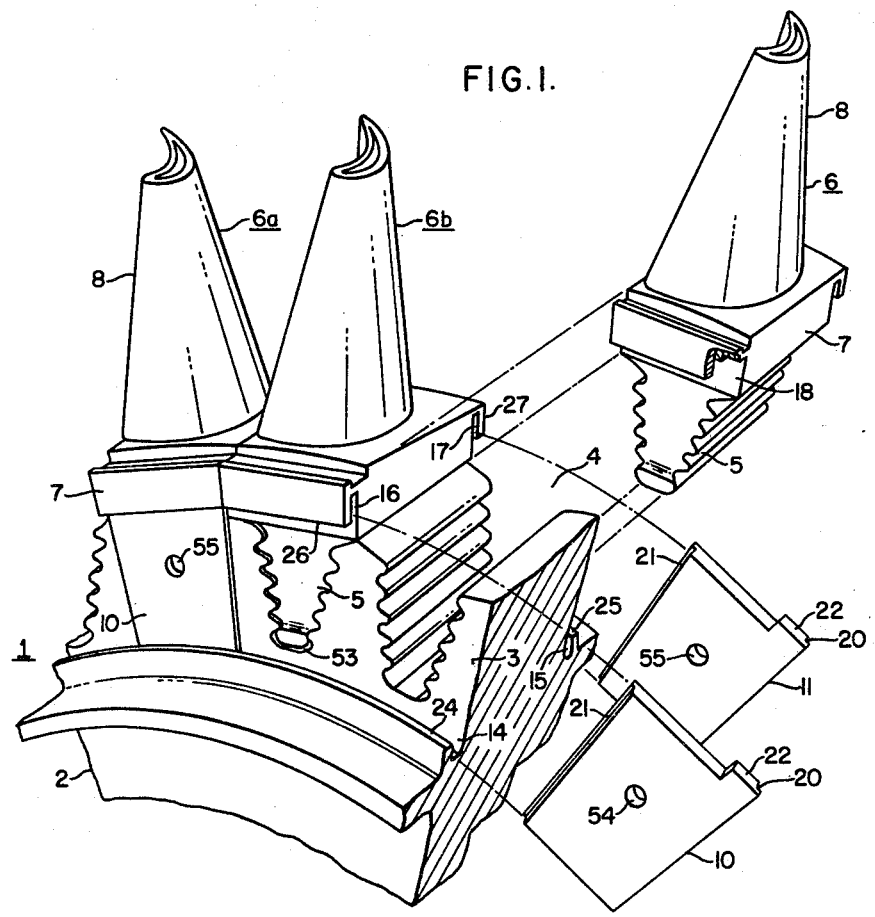
FIGURE 1 is a perspective view of turbine rotor blades and a portion of a rotor disc showing blade root and side plate structures constructed in accordance with the principles of the invention.

Referring to the drawings in detail, FIGURE 1 shows a portion of rotor 1 for an axial fluid flow turbine (not shown). The rotor comprises a disc 2 having a peripheral portion 3 provided with axially extending serrated channels 4 for receiving serrated root portions 5 of turbine blades 6 in intermeshing relation. Each of the blades 6 which are of the "side entry" type, has essentially three basic portions, namely the root 5, a platform 7 and an airfoil portion 8.

The blades 6 and disc 2 further have an upstream side which faces, and is designed to receive, a flow of motive fluid (not shown) for driving the rotor 1, and a side facing away from said flow which is the downstream side.

The root 5 of each of the blades 6 is inserted into the channel 4 in a direction along the axis of the disc 2, and is secured therein from axial displacement by side plates 10 and 11 in a manner presently explained.

The upstream and downstream sides of the rotor disc 1 are provided with circumferentially extending and radially outwardly facing grooves 14 and 15 respectively. Each groove forms a continuous circular slot about the radial center of the disc though only a portion thereof is shown in the figures.

The platforms 7 of the rotor blades 6 are provided with radially inwardly facing grooves 16 and 17 respectively on their upstream and downstream sides. When the blades 6 is inserted in the channels 4, the grooves 16 and 17 are located radially outwardly from the circular grooves 14 and 15 provided in the disc 2.

Figure 2:
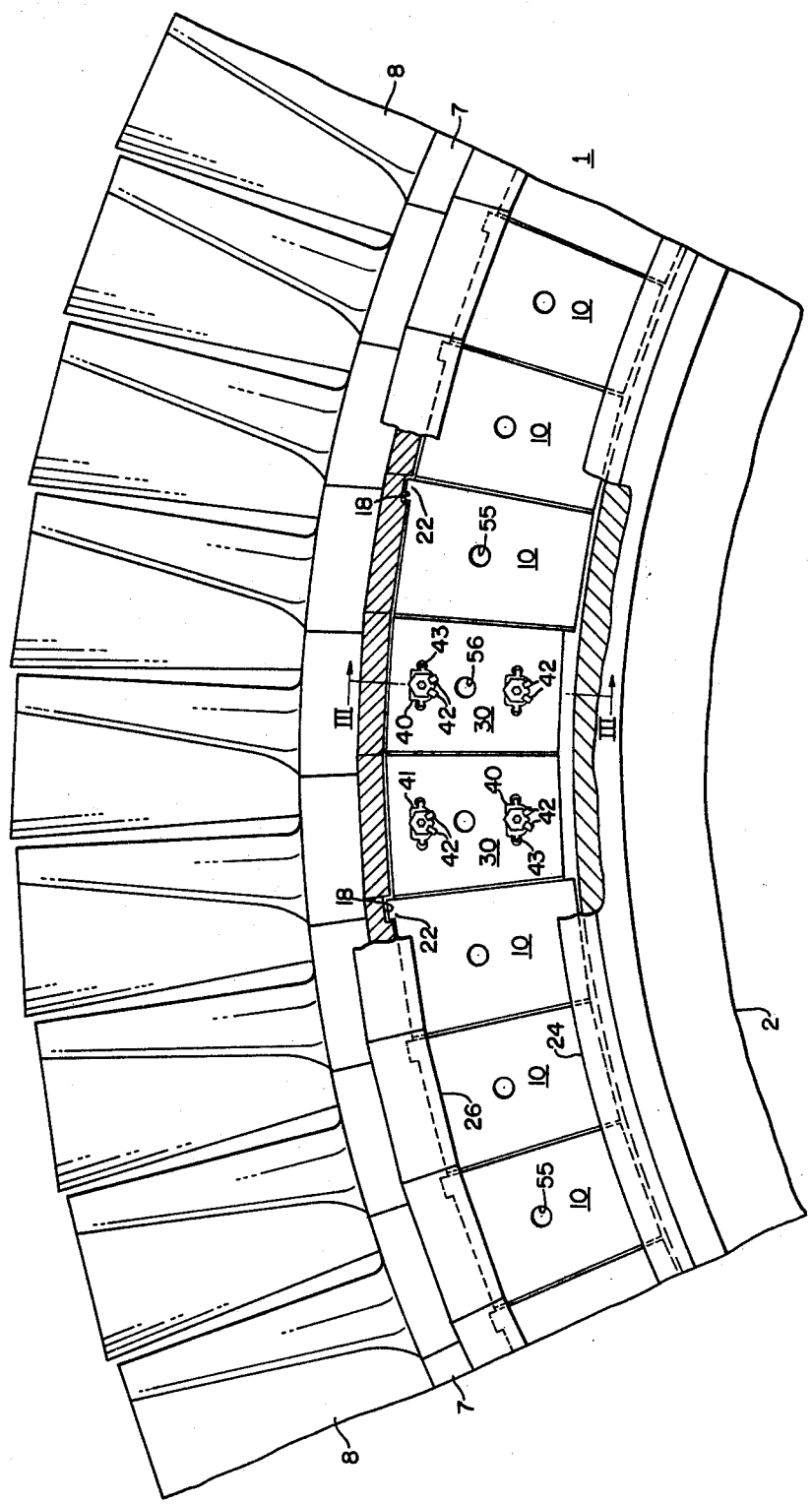
FIG. 2 is a partial side elevation view of a turbine rotor showing side plates secured therein in accordance with the invention.
Figure 5:
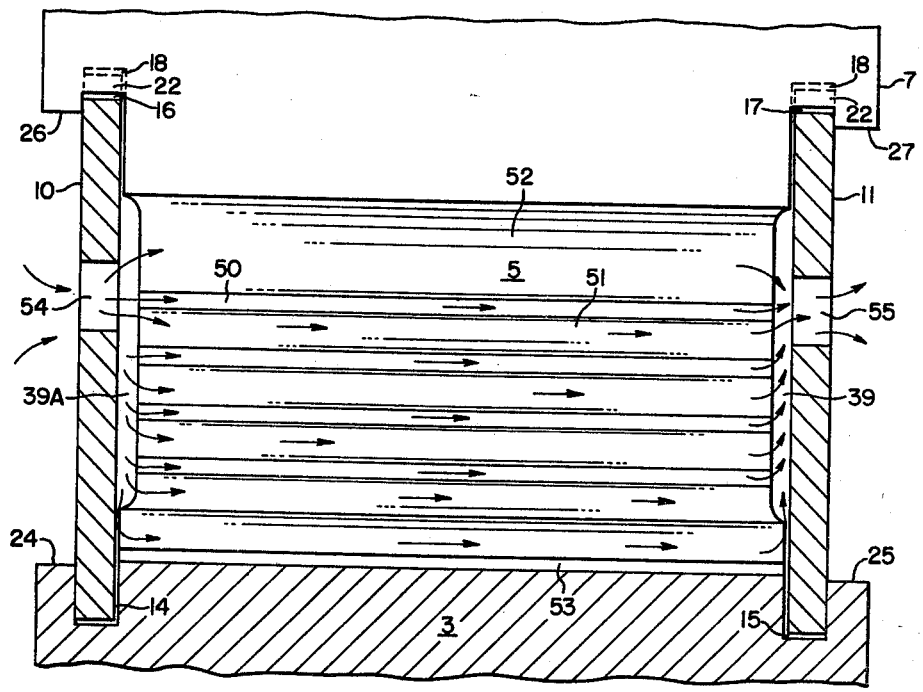
FIG. 5 is a side elevation view of the structure shown in FIG. 4.

The grooves 16 and 17 in the blade platforms 7 are further provided with an indexing slot 18 as seen in FIGS. 1, 2 and 5.

As seen in FIG. 1, the plates 10 and 11 are provided with lip or shoulder portions 20 and 21 on two opposed edges thereof respectively and facing in opposite directions, and a tab portion 22 extending in an outwardly radial direction from an outer corner of each plate.

The blades 6 and the plates 10 and 11 are assembled with the disc 2 in the following manner: One of the blades (blade 6a, for example) is first axially inserted into its associated channel 4, see FIG. 1; when the root 5 of the inserted blade is axially centered therein, a set of plates 10 and 11 is disposed between the inserted blade and the disc 2 by inserting the plates into the grooves 14 and 15, and 16 and 17 respectively in a circumferential direction towards the blade 6a, or from right to left in FIG. 1. Each plate is moved into the grooves until its tab 22 enters the slot 18 and, more particularly, until the tab engages the ledge provided by the slot 18. Thus, the slot and tab form an indexing means for properly orienting each plate with its associated blade 6.

After the first blade 6a is inserted in its associated channel 4 of the disc 2, and its associated plates 10 and 11 are properly disposed in the grooves 14 to 17, a next blade 6b is inserted into the next adjacent channel 4 and a pair of associated plates 10 and 11 inserted in the manner described. This process is continued until all but the last set of plates is ready for disposal in the periphery 3 of the rotor disc 2. The first and last plate sets to be inserted are inserted in a manner different from that described above for reasons to be explained hereinafter.

As successive plates are disposed in the grooves 14 to 17, the lip portions 20 and 21 of adjacent plates engage each other in an overlapping relationship which causes the interlocking of adjacent plates together. Further, the plates are prevented from moving circumferentially in the grooves by the tab 22 extending into the slot 18 of each respective blade and an adjacent leading edge of each adjacent blade, as best seen in FIG. 2.

The grooves 14, 15, 16 and 17 provide radially extending ledges 24, 25, 26 and 27, respectively, which hold the plates in place at each end or side of each blade root 5 so that the blades 6 cannot be axially displaced from the periphery 3 of the disc 2. The intermeshing serrations provided in the channels 4 and roots 5 prevent the blades from radial displacement with rotation of the rotor 1. When all the plates are assembled between the disc 2 and the blades 6, the plates form a continuous circular wall as partially shown in FIG. 2.

Figure 3:
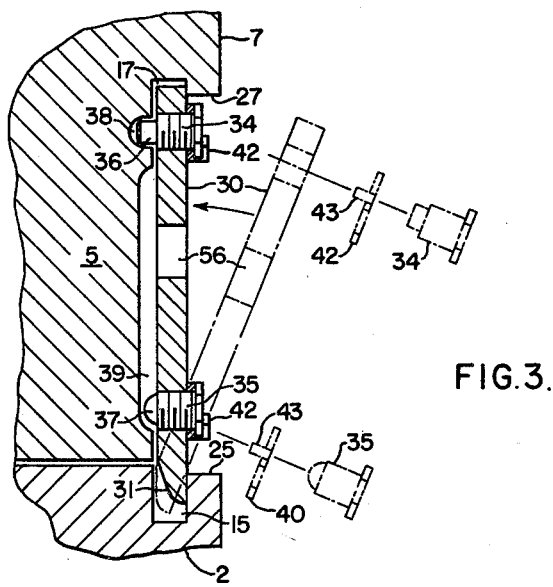
FIG. 3 is a side sectional view of a plate taken along lines III—III of FIG. 2.

When all but the last plate set are disposed in the grooves 14 to 17, the clearances are insufficient for inserting a last plate set 10 and 11 of the type shown and in the manner described above. For this reason first and last plate sets, of a construction different from that of the plates 10 and 11, are provided. Such a construction is shown in FIG. 3 and includes a plate 30 shown in cross section and in phantom. Only one plate 30 is shown in FIG 3; however, four such plates (and their securing means) are required, namely, a first set to be initially inserted before the assembly process described above is started, and a last set to complete the assembly process and thus provide a rotor having blades thoroughly cooled and thus provide a rotor having blades thoroughly secured in place in the periphery thereof and blade roots thoroughly cooled in the manner described hereinafter.

In order to insert the first and last plates 30, a clearance must be provided to allow the plates to pass the ledges 24 and 25, and 26 and 27 so that they may be disposed in the grooves 14 to 17. In FIG. 3, this is accomplished by providing each plate 30 with a chamfered or bevelled portion 31 along one face thereof. This permits the bevelled portion to be first inserted into the groove 15, as shown in FIG. 3, so that the top of the plate can clear the ledge 27 of the blade platform 7 as the plate is thrust towards the face of the blade root 5. After the plate 30 is located between the grooves 15 and 17, it is raised into the groove 17 so that the upper portion thereof engages the ledge 27. The plate is then secured in this position by lockscrew or bolts 34 and 35, shown threaded into the plate, with end portions 36 and 37 extending through the plate into recesses 38 and 39 respectively provided in the face of the blade root 5. The upstream and downstream ends of the roots are provided with recesses 39A and 39 which aid in directing cooling fluid past the roots in a manner to be explained.

The recess 38 and the lockscrew 34 further serve as indexing means for properly locating the plates 30 with their respective blades 6. Thus, the plates 30 are not provided with the indexing tab 22 of the plates 10 and 11. Both indexing features, however, permit independent tangential expansion of the plates without the plates becoming bunched or separated. In this manner, uncontrolled leakage of cooling fluid is prevented. During rotation of the rotor 1, centrifugal force moves the plates radially into the grooves 16 and 17 and against the blade platform 7.

Before the lockscrews 34 and 35 are disposed in the plates, suitable lockwashers 40 are disposed between the heads of each lockscrew and the plates 30 to secure the lockscrews in place and thereby insure the security of the plates 30 which, in turn, secure the plates 10 and 11.

As shown in FIGS. 2 and 3, the lockwashers 40 may have bottom and side tab portions 42 and 43 respectively, the side tabs extending into accommodating holes provided in the plates (FIG. 2) while the bottom tabs are bent up and against the heads of the lockscrews. Other suitable locking means may be employed, for example, wire extending through holes provided in the heads of the lockscrews could engage holes or slots provided in the plates.

As thus far described, the plates 10, 11 and 30 function to retain the blades 6 in the root accommodating channels 4 provided in the periphery 3 of the disc 2. The plates however perform another very important function, namely, the function of cooling the roots 5 of the blades by controlling the flow of cooling air (or other fluid) past the roots, and preventing the hot motive gases directed against the airfoil portions 8 of the blades from entering the area of the roots and the root accommodating channels 4.

Figure 4:
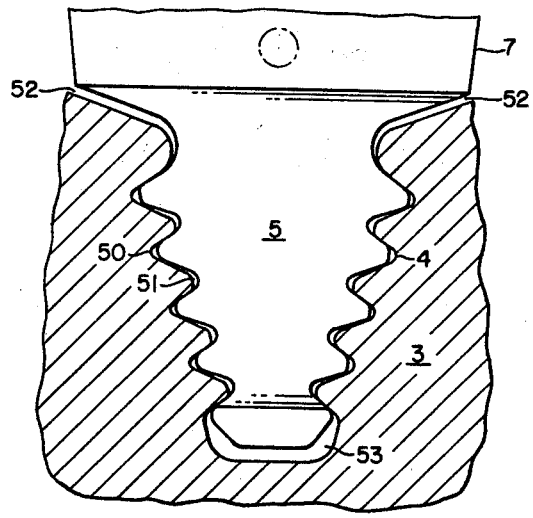
FIG. 4 is an end elevation view of a blade root portion disposed in the periphery of a rotor disc (in section) in accordance with the invention.

As best seen in FIG. 4, the serrations provided in the channels 4 and in the roots 5 are formed and dimensioned to provide spaces 50 and 51 between the serrations with the serration disposed in intermeshing relation, said spaces extending axially the length of each root to join the recesses 39A and 39 formed in the faces of the roots. (A similar root and channel construction is shown in U.S. Patent 3,189,320 issued to F. A. Bildecos et al. June 15, 1965 and assigned to the present assignee.) In a similar manner, the top and bottom portions of each root are formed and dimensioned to provide spaces 52 and 53 respectively which extend axially of the root to communicate with the recesses 39A and 39.

As seen in FIGS. 1, 2, 3 and 5, the plates 10, 11 and 30 are provided with openings 54, 55 and 56 respectively for controlling the flow of cooling fluid past the roots 5 in the manner shown in FIG. 5 as indicated by appropriate arrows.

In operation, a cooling fluid (from an associated air compressor operating with the turbine, for example) enters the recess area 39A of the root 5 through the opening 54 in plate 10, 39A and 54 being the inlet recess and opening for the flow of cooling fluid. (The exhaust opening and recess are 55 and 39 respectively.) The cooling fluid spreads out in the recess area 39A and enters the spaces 50 to 54 which spaces function as passageways to conduct the cooling fluid to the exhaust recess 39 and out the exhaust opening 55 in the plate 11. In this manner, the root of each blade 6 is cooled, the plates 10, 11 and 30 controlling the flow of cooling fluid past the roots while simultaneously closing off the area about the roots so that the hot motive gases cannot enter and thus overheat the roots. The openings 56 in the first and last plates 30 function in the same manner as the openings 54 and 55 in plates 10 and 11.

From the foregoing description it should now be apparent that a new and useful locking and cooling structure has been disclosed for turbine blades in which apertured side plates are disposed at the ends of the roots of the blades to control the flow of cooling fluid through passageways provided between roots and a supporting rotor disc, to prevent the entry of hot motive gases into the area of the blade roots, and to secure the blades in the disc from axial movement.

Though the invention has been described with a certain degree of particularity, changes may be made therein without departing from the spirit and scope thereof. For example, the invention has been described using only one rotor disc. Obviously, a plurality of such discs may be employed using the principles of the invention without departing from the scope of the invention. Similarly, the roots of the blades and the side entry disc channels may have other forms than the serrated form shown, as well as passageways formed in a manner different from that shown in FIGS. 4 and 5 for cooling the blade roots.

We claim as our invention:

1. Side plate structure for the blades of a turbine rotor, each of said blades having a root portion secured in channels provided in the periphery of a rotor disc, and a platform portion joining the root portion to an airfoil portion of each blade, said side plate structure comprising:
   two plates associated with each rotor blade, said plates being disposed respectively on the upstream and downstream sides of the root portion of each blade,
   grooves provided respectively in the rotor disc and blades for retaining said plates at the side of the root portion,
   a plate indexing slot provided in the grooves of each blade,
   each of said plates having an indexing tab or projection extending into an associated one of said slots,
   a first and last plate for disposal on each side of the root portions of two associated blades,
   means for locating and securing said first and last plates between the rotor disc and their associated blades, and
   passageways extending axially of the root portions for conducting a flow of fluid for cooling the root portions, and
   means provided in said plates for controlling the flow of cooling fluid.

2. The structure described in claim 1 in which the plates are provided with lip portions on opposed edges thereof and in oppositely facing directions,
   the lip portions providing means for interlocking adjacently disposed plates together.

3. The structure described in claim 1 in which the channels and roots are formed and dimensioned to provide the axially extending passageways in an area between the roots and the walls of the channels.

4. The structure described in claim 1 in which the roots and channels are provided with serrated surfaces extending axially of the rotor disc and blades for mutual intermeshing engagement when the roots are disposed in the channels,
   the axially extending passageway being formed between said intermeshing serrated surfaces of the roots and channels.

5. The structure described in claim 1 in which the first and last plates are provided with a bevelled edge portion on at least one face thereof.

6. The structure recited in claim 1 in which the end faces of the blade roots are provided with recessed portions, and
   the means for locating and securing the first and last plates include lockscrews having end portions extending through the first and last plates, with said recessed portions accommodating said end portions of said lockscrews.

7. The structure recited in claim 1 in which the means for locating and securing the first and last plates include lockscrews threaded into accommodating threaded openings in the first and last plates,
   said lockscrews having end portions extending through the first and last plates for indexing and holding the plates in place.

8. In a rotor for an axial flow fluid machine, said rotor comprising at least one rotor disc with channels provided in the periphery thereof for receiving the root portion of rotor blades, passageways extending axially of the root portions, said passageway being capable of conducting a flow of cooling fluid therethrough,
   the improvement comprising,
   two plates associated with each rotor blade, said plates being disposed respectively on the upstream and downstream sides of the root portions of each blade,
   grooves provided respectively in the rotor disc and blades for receiving and retaining said plates therein,
   said grooves in each blade being provided with a plate indexing slot,
   each of said plates having an indexing projection or tab extending into an associated one of said slots,
   a first and last plate for disposal on each side of the root portions of at least two associated blades,
   means for locating and securing said first and last plates between the rotor disc and their associated blades, and
   means provided in said plates for controlling the flow of cooling fluid.

9. The structure described in claim 8 in which the plates are provided with lip portions on opposed edges thereof and in oppositely facing directions,
   the lip portions providing means for interlocking adjacently disposed plates together.

10. The structure described in claim 8 in which the channels and roots are formed and dimensioned to provide the axially extending passageways in an area between the roots and the walls of the channels.

11. The structure described in claim 8 in which the roots and channels are provided with serrated surfaces extending axially of the rotor disc and blades for mutual intermeshing engagement when the roots are disposed in the channels.
   the axially extending passageway being formed between said intermeshing serrated surfaces of the roots and channels.

12. The structure described in claim 8 in which the first and last plates are provided with a bevelled edge portion on at least one face thereof.

13. The structure recited in claim 8 in which the end faces of the blade roots are provided with recessed portions, and
the means for locating and securing the first and last plates include lockscrews having end portions extending through the first and last plates, with said recessed portions accommodating said end portions of said lockscrews.

14. The structure recited in claim 8 in which the means for locating and securing the first and last plate include lockscrews threaded into accommodating threaded openings in the first and last plates.
said lockscrews having end portions extending through the first and last plates for indexing and holding the plates in place.

15. In a rotor for an axial flow fluid machine, said rotor comprising at least one disc with channels provided in the periphery thereof for receiving the root portions of rotor blades, said channels and said root portions being provided with serrations, axially extending passageways provided between the root and channel serrations, and between the top of the disc and an upper portion of the roots, said passageways being capable of conducting a flow cooling fluid therethrough,
the improvement comprising,
two plates associated with each rotor blade, said plates being disposed respectively on upstream and downstream side of the root portions of each blade,
grooves provided respectively in the rotor disc and blades for receiving and retaining said plates therein,
said grooves in each blade being provided with a plate indexing slot,
each of said plates having an indexing projection extending into an associated one of said slots,
each of said plates being provided further with a lip portion on opposed edges thereof and in oppositely facing directions, the lip portions providing means for locking adjacently disposed plates together,
a first and last plate for disposal on each side of the root portions of two associated blades,
a bevelled edge portion provided on at least one face of said first and last plates,
lockscrew means for securing said first and last plates between the rotor disc and their associated blades, and
at least one opening provided in each of said plates for controlling the flow of cooling fluid past the root portions of each blade.

References Cited

UNITED STATES PATENTS

| | | |
|---|---|---|
| 2,755,063 | 7/1956 | Wilkinson. |
| 2,985,426 | 5/1961 | Hunter et al. |
| 2,988,325 | 6/1961 | Dawson. |
| 3,043,562 | 7/1962 | Van Nest et al. |

EVERETTE A. POWELL, Jr., Primary Examiner

U.S. Cl. X.R.
253—77